United States Patent [19]
Beery et al.

[11] 3,970,935
[45] July 20, 1976

[54] WIDE-RANGE DIGITAL RELUCTANCE TACHOMETER

[75] Inventors: Jack Beery, Farmington; Daniel A. Wisner, Milan, both of Mich.

[73] Assignee: Burroughs Corporation, Detroit, Mich.

[22] Filed: Feb. 18, 1975

[21] Appl. No.: 550,596

[52] U.S. Cl. .......................... 324/166; 340/347 P; 324/164
[51] Int. Cl.² ...................... G01P 3/48; H03K 13/20
[58] Field of Search ............. 324/164, 166, 78, 168; 340/347 P, 347 AD; 310/121

[56] References Cited
UNITED STATES PATENTS

| | | | |
|---|---|---|---|
| 3,123,818 | 3/1964 | Steele | 340/347 |
| 3,206,738 | 9/1965 | Wayman | 340/347 |
| 3,688,306 | 8/1972 | Oishi et al. | 340/347 P |
| 3,702,467 | 11/1972 | Melnyk | 340/200 |
| 3,739,211 | 6/1973 | Hasler | 310/168 |

*Primary Examiner*—R. V. Rolinec
*Assistant Examiner*—Vincent J. Sunderdick
*Attorney, Agent, or Firm*—Ronald L. Taylor; Edwin W. Uren

[57] ABSTRACT

A digital tachometer for generating electrical pulses at a rate indicative of the speed of rotation of a shaft-like member. A first toothed disk having N teeth is affixed to the shaft and a housing having a second set of M teeth is fixed with respect to the shaft and positioned around the toothed disk. As the shaft rotates, individual ones of the teeth on the outer periphery of the disk which is affixed to the rotating shaft alternatively pass into and out of close proximity to individual ones of the teeth of the outer housing resulting in periodic increases and decreases in the reluctance of the system. A sensing coil is positioned with respect to the housing so as to generate an electrical current which varies as the reluctance changes from one polarity to another as the shaft rotates. At each point of maximum reluctance and at each point of minimum reluctance, the polarity of the reluctance and correspondingly the slope of the current waveform changes and these changes are detected by a slope-change detector circuit which generates a digital signal in response thereto. The rate of generation of these digital signals is therefore indicative of the speed of rotation of the shaft and the speed of rotation can be sensed over a very wide range from very slow rotational speeds to very high speeds.

10 Claims, 9 Drawing Figures

WIDE-RANGE DIGITAL RELUCTANCE TACHOMETER

BACKGROUND OF THE INVENTION

The invention relates generally to a reluctance change sensor and more particularly to a reluctance-responsive digital tachometer for generating electrical pulses at a rate indicative of the speed of rotation of the rotating shaft.

In many mechanical systems utilizing rotating shafts, it is frequently necessary to accurately measure the number of revolutions per unit of time, hence the speed of rotation of the shaft. Many systems of the prior art have been designed to generate and count electrical pulses as a measure of the speed of shaft rotation. Common techniques utilize optical encoders associated with the shaft wherein an optical slotted disk is mounted on the shaft and provided with a ring of spaced slots on the outer periphery thereof. A light source and light detector are aligned on opposite sides of the disk such that a pulse of light is passed to the light detector as each of the slots passes between the light source and the light detector as the disk rotates with the shaft. Each pulse of light which is received by the light detector is processed and counted, the total count being proportional to the number of complete or partial rotations of the shaft.

Many of the systems of the prior art are subject to various errors; are operable only over relatively narrow ranges of shaft speeds; and are dependent upon the diameter of the slotted disk. Many such systems employ complex and relatively expensive circuitry for generating and counting the pulses, and errors often occur in the optical portion of such systems.

Some systems of the prior art have employed a toothed magnetic disk attached to a rotating shaft and employed a magnetic pickup which responded to the magnetic teeth of the disk for generating an analog signal as each tooth passed the magnetic pickup. Such systems have generally required rather sophisticated circuitry for shaping the resulting pulses or employed complex circuitry for detecting peaks of predetermined magnitudes or the like, and were operable over relatively narrow ranges of rotational shaft speeds. None of the magnetic systems of the prior art are accurate from extremely low shaft rotation speeds to extremely high shaft rotation speeds regardless of the sophistication of the circuitry involved, and none of the relatively simple circuits employed gave well-defined digital pulses over a reasonable range of speeds such as may be obtained with the circuit of the present invention.

SUMMARY OF THE PRESENT INVENTION

It is an object of the present invention to provide a system for generating electrical signals in reponse to reluctance changes.

It is an object of this invention to provide a device for measuring the speed of rotation of rotating shafts over a wide range of speeds.

It is another object of the present invention to provide a digital tachometer which is responsive to reluctance changes for measuring the speed of rotation of a shaft.

It is a further object of the present invention to provide a reluctance-responsive digital tachometer which does not necessarily require a disk of magnetized material or a toothed housing or magnetized material.

It is still a further object of the present invention to provide a reluctance-responsive digital tachometer employing a slope-change detector circuit which detects the point of maximum reluctance and the point of minimum reluctance for generating digital pulses in response thereto.

It is yet a further object of the present invention to provide a reluctance-responsive digital tachometer wherein any errors which normally might result from improperly spaced teeth are averaged out and wherein a cusp detector circuit enables the point of minimum reluctance and the point of maximum reluctance to be accurately detected regardless of the speed of rotation of the shaft.

It is still another object of the present invention to provide a reluctance-responsive digital tachometer with a resolution as high as $M \times N$ digital pulses per revolution where M is the number of teeth in a housing and N is the number of teeth on a rotating shaft and $M \neq N$.

These and other objects and advantages of the present invention are accomplished in a system wherein a first disk-like member having a plurality of N teeth on the periphery thereof is rigidly attached to a rotating shaft. A housing member is positioned about the toothed disk and contains a second set of M teeth such that as the toothed disk rotates within the housing, individual ones of the N teeth of the disk are aligned with individual ones of the M teeth of the housing to provide for points of maximum reluctance and are alternately spaced midway between successive ones of the M teeth on the housing to provide for points of minimum reluctance. A sensing coil is coupled to the housing and used to generate an electrical signal which varies with the changes in the reluctance of the flux path which is established between the housing and the disk as the shaft rotates. The sensing coil is connected to a slope-change detector circuit which responds to the points of maximum reluctance and the points of minimum reluctance to generate digital pulses in response to the rate at which these points of minimum and maximum reluctance are detected. The rate of generation of the digital pulses at the output of the slope-change detector is indicative of the speed of rotation of the shaft and may be counted or processed by means known in the art to obtain the speed of rotation of the shaft. The use of a plurality of teeth on the disk and on the associated housing allows the system to average out spacing errors which might normally result from improperly spaced teeth and a voltage source may be connected across the sensing coil to supply sufficient current to eliminate the need for using permanently magnetized material in either the disk or the housing, thereby enabling ordinary ferromagnetic materials to be used. A resolution of as much as $M \times N$ digital pulses per revolution can be obtained for cases in which $M \neq N$ and no cancellation occurs. The slope-change detector is able to detect the change in the polarity of the slope of the current waveform which occurs at approximately the point at which maximum reluctance and minimum reluctance occur so as to enable the system to be used over a wide range of shaft speeds.

BRIEF DESCRIPTION OF THE DRAWINGS

Other objects, advantages and features of this invention will become more fully apparent from the following detailed description, appended claims, and accompanying drawings in which like reference numerals designate corresponding parts:

DETAILED DESCRIPTION OF THE INVENTION

Figure 1:
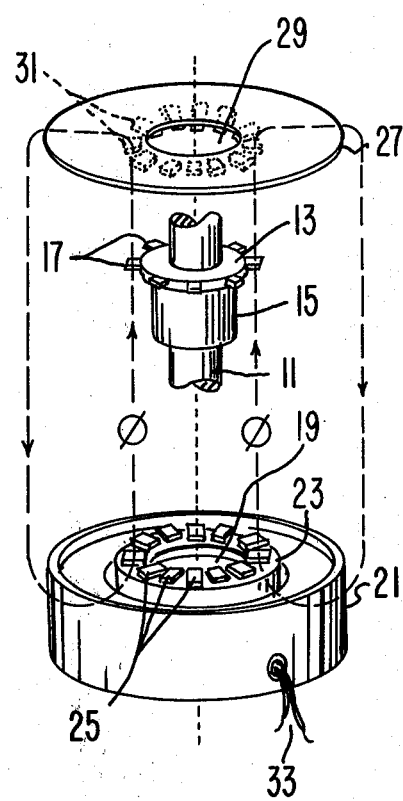
FIG. 1 shows an exploded view of a toothed disk and housing assembly of the present invention.

FIG. 1 shows an exploded view of one embodiment of a toothed disk and housing assembly of the present invention. A rotatable shaft 11 has attached thereto a disk-like member 13 via an attachment collar 15. The periphery of the shaft-mounted disk 13 contains a first set of N teeth 17. The teeth may be of a ferromagnetic material such as soft iron or the like or they may be formed from a material which is permanently magnetic. The shaft 11 and the disk-mounting collar 15 reside within a central opening 19 of a housing assembly 21. The housing assembly 21 includes a central collar portion 23 surrounding the central opening 19 and the top of the central collar portion 23 includes a second set of M tooth-like members 25. The toothed disk 13 is positioned in the opening 19 via shaft 11 and collar 15 such that the teeth 17 pass in close proximity to the toothed members 25 as the shaft 11 rotates. A housing assembly cover 27 includes a central aperture 29 and a third set of M tooth-like members 31 on the underside of the cover 27 which correspond in number and position to the set of M toothed members 25 and which are positioned thereover in close proximity thereto such that the N teeth 17 of the toothed disk 13 pass between the matched pairs of M toothed members 25 and 31 so as to create a point of minimum reluctance when one of the set of N teeth 17 is aligned directly between one of the teeth 31 and a corresponding one of the teeth 25 and so as to cause a point of maximum reluctance whenever one of the set of N teeth 17 is midway between a first pair of corresponding teeth 25, 31 and a second adjacent pair of corresponding teeth 25, 31. A sensing coil 33 is wrapped about the housing assembly 21 such that the current induced in the sensing coil 33 will vary with the changes in the reluctance of the flux path which is established between the teeth 31 of the housing assembly cover 27, the cover 27 (radially outward from the teeth), the sides of the housing 21, radially in through the housing to the collar 23, up through the teeth 25 and through the teeth 17 to the housing cover teeth 31, all of which may be constructed of ferromagnetic material or the like.

Figure 2:
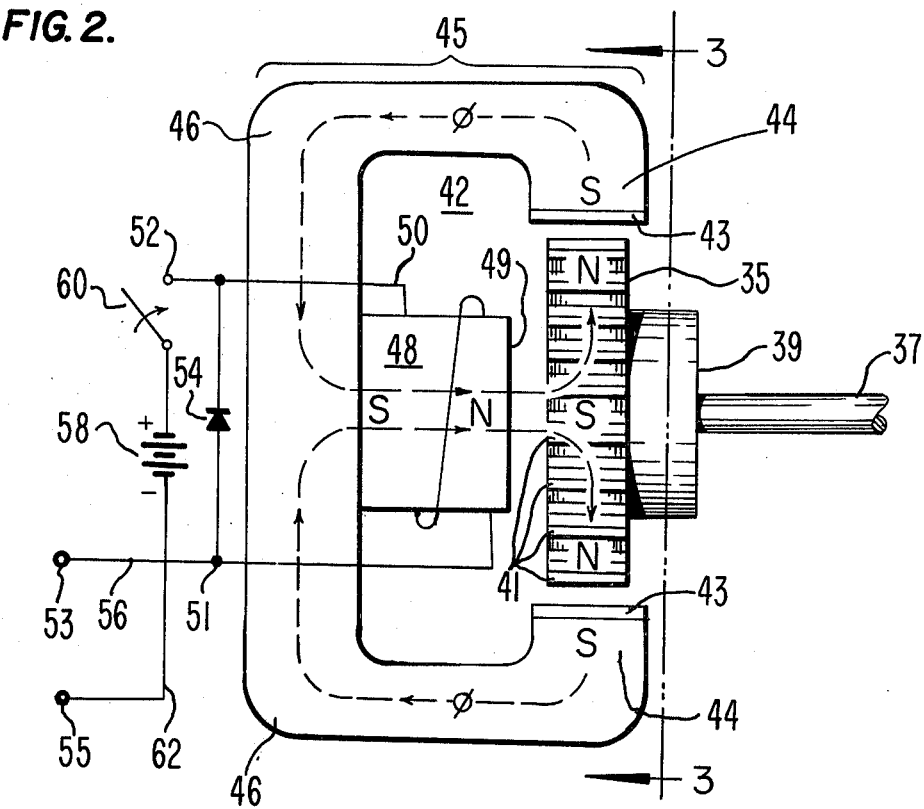
FIG. 2 shows a sectional view of the prime embodiment of the toothed disk and toothed housing assembly of the present invention.

A second embodiment of the toothed disk housing assembly of the present invention is shown in FIG. 2. A disk-like member 35 is mounted on a rotating shaft 37 via a disk-fastening collar 39. The periphery of the disk-like member 35 includes a first set of N tooth-like members 41. A cavity forming assembly housing member 45 has a generally circular opening in the front wall thereof which opens into a central cavity portion 42. The front wall portion 45 defines a central opening which is adapted for receiving the disk-like member 33 into the entrance of the cavity 42 and the outer periphery of the wall 44 which defines the central opening is provided with a corresponding set of M tooth-like members so as to surround the tooth-like members 41 of the disk-like member 35 which is mounted for rotation within the central opening. The housing member 45 includes a central cavity-defining portion 46 and a base portion 47. The base portion 47 includes a central rod-like portion 48 which extends into the central cavity 42 so as to present a face 49 of the rod-like member 48 in proximity to the central portion of the inner surface of the disk-like member 35. An electrical coil 50 is wound around the rod-like support member 48 such that one end of the coil 50 is connected to a node 51 and the opposite end of the coil is connected to a terminal node 52. A diode 54 is connected across the ends of the coil with its anode coupled to node 51 and its cathode coupled to terminal junction 52. A sensing coil output 53 is taken from node 51 via lead 56. The terminal junction 52 is connected to the positive terminal of a battery or source of potential 58 via a switch 60 and the negative terminal of the battery 58 is connected to a second sensing circuit output 54 via lead 62.

The disk-like member 35 and the housing member 45 are comprised of a magnetic or ferromagnetic material so as to establish a flux path as shown by the arrows of FIG. 2. In actuality, the established flux path is three dimensional and runs from the tooth-like members 41 on the outer periphery of the disk-like member 35 across the air gap of the central opening to the tooth-like members 43 on the periphery of the central opening defined by the front wall portion 44 of the housing member 45, and thence through the cavity-defining portion 46 to the base 47 of the assembly member 45, and thence through the central rod-like portion 48 and out the face 49 across the air gap to the central portion of the face of the disk-like member 35 which faces the cavity 42 and thence radially outward in the disk-like member 35 to the toothed periphery thereof so as to complete the three dimensional flux path.

The sensing coil 50 is wrapped around the central rod-like support portion 48 of the housing member 45 such that the electrical signal appearing at the output terminals 53, 55 will vary as the reluctance in the established flux path changes with the rotation of the disk-like member 35. While the illustration of FIG. 2 shows the rotation of the disk-like member 35, it will be readily observable to those skilled in the art that the disk-like member 35 could be maintained stationary while the assembly member 45 were allowed to rotate so as to achieve a flywheel effect, or both the disk-like member 35 and the housing member 45 could be allowed to rotate should it be desired to obtain a differential velocity as frequently required in the prior art. It may also be noted that if a permanently magnetic material were utilized, or in the alternative a magnetizable material with a high degree of magnetic retention, then the power supply or battery 58 could be reduced or possibly eliminated entirely.

Figure 3:
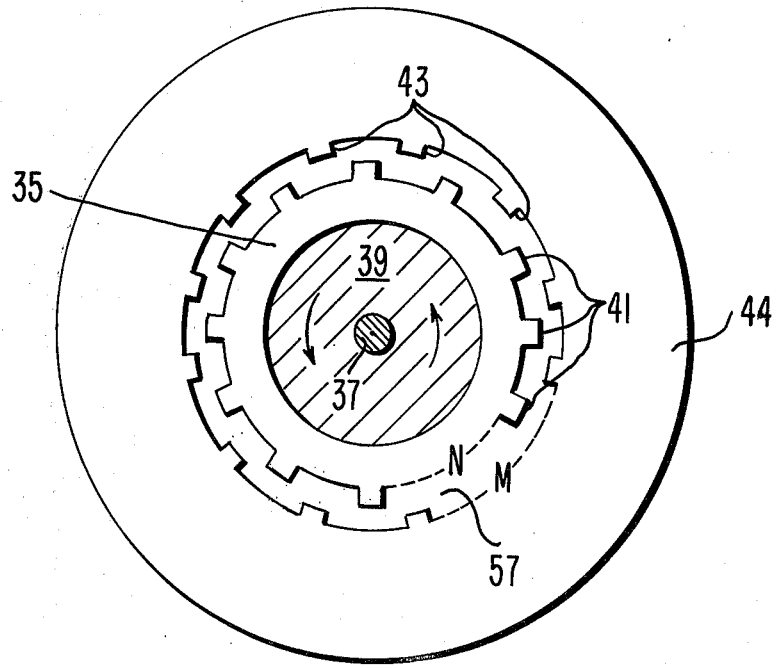
FIG. 3 shows a sectional view of the toothed disk and housing assembly of the present invention taken along lines 3—3 of FIG. 2.

FIG. 3 shows a sectional view taken along the lines 3—3 of FIG. 2, and shows the arrangement of the teeth for the creation of a point of maximum reluctance. It may be noted that the teeth 41 of the disk-like member 35 which is mounted on shaft 37 are positioned midway between adjacent ones of the tooth-like members 43 of the central opening-defining wall 44 of the housing member 45. It will be readily seen that if the shaft were rotated an angular distance equal to one-half the spacing between adjacent ones of the teeth 41, the teeth 41 would be aligned directly opposite corresponding ones of the tooth-like members 43 of the central opening-defining wall 44 of the housing element 45 such that points of minimum reluctance would be obtained. In the drawing of FIG. 3, the disk-like member 35 is shown as having N teeth 41 on the periphery thereof while the housing is shown as having M tooth-like members 43 spaced around the disk-like member 35. In the example of FIG. 3, N was set equal to M for illustration purposes. It will be readily apparent that errors which would normally result from an erroneous spacing of one or more of the teeth 41 or the tooth-like members 43 will be averaged out when a large number of teeth on both of the disk-like member 35 and the housing element 45 are used and this averaging out is maximized when N = M, i.e. the number of teeth 41 is made equal to the number of tooth-like members 43. In this case, however, the maximum resolution which can be obtained is N digital pulses per revolution since 2N points of reluctance change will be detected, N points at which the reluctance traverses a maximum and N points wherein the reluctance traverses a minimum. If, however, a large number of teeth are used such that spacing errors are unimportant, or in the event that there are no spacing errors, then a much greater resolution can be achieved by setting N unequal to M. In this case the maximum resolution of M × N pulses per revolution can be obtained and this may be extremely important when a high degree of resolution is desirable as in many applications presently utilizing high-resolution optical encoders. As an aid in understanding, the following examples may be given. Suppose that N equals 4 such that there are four teeth 41 on the disk-like member 35 and that N is equal to M such that there are also four tooth-like members 43 on the periphery of the central opening-defining wall 44 of the housing element 45. If all of the teeth or tooth-like members are equally spaced, then only N pulses or four for this particular example will be generated for one complete revolution of the shaft 37. If, on the other hand, M is set equal to 4 such that there are four evenly spaced toothed members 43 on the housing, but N is set unequal to M such that there are only three teeth 41 on the disk-like member 35, then M × N or 12 pulses will be generated during one complete revolution of the shaft 37 since 12 points of maximum reluctance and 12 points of minimum reluctance will be traversed. In order to more fully understand, consider a case where N = 25 and M = 26 such that 650 digital pulses will be generated per shaft revolution, and as the number of teeth are increased, the resolution will increase even more. It will be noted that the resolution of M × N will be a maximum only since there will be cases where values of N and M will be selected such that minimum and maximum points of reluctance may cancel one another out, but these may be resolved by simple experimentation or a mathematical analysis which does not form a portion of the present invention. In every case the resolution will be proportional to the number of reluctance changes seen in any non-equal combination of sets of teeth, and a high degree of resolution with little or no chance of spacing errors may be achieved with ease. It will be noted that an air gap or space 57 exists between the teeth 41 of the disk-like member 35 and the tooth-like members 43 of the central opening-defining walls 44 of the housing member 45.

Figure 4:
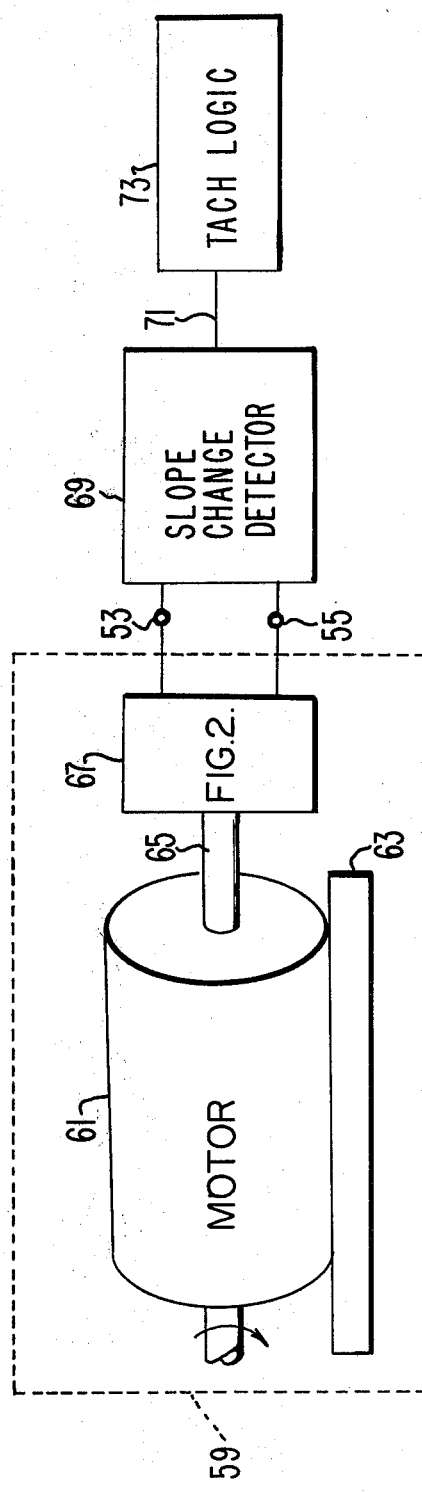
FIG. 4 is a block diagram of the reluctance-responsive digital tachometer of the present invention.

FIG. 4 shows a block diagram of the reluctance-responsive digital tachometer of the present invention. A shaft and encoder assembly is shown as enclosed within the dotted block 59. The block is shown to include a motor 61 having a base 63 and a rotating shaft 65. Attached to the rotating shaft 65 would be the toothed disk and housing assembly of FIG. 1 or FIG. 2 which is indicated by block 67. This assembly is shown within the dotted lines of block 59 but it would be perfectly feasible to construct the motor itself such that the toothed housing assembly 45 could be an integral part of the housing of the motor 61 and the toothed disk could be internally mounted on the shaft 65 within the motor housing such that nothing would exist external to the motor except for the output leads 53 and 55 of the sensing coil 47 of FIG. 2. A slope-change detector circuit is represented by block 69. It includes a circuit which responds to changes in the polarity of the slope of the current waveform reflecting the approximate points of minimum and maximum reluctance to generate a series of digital pulses representative thereof. These pulses are transmitted via lead 71 to the tachometer logic of block 73 which may contain digital counters or the like which can be used to convert the pulses arriving at input 71 into an indication of rotational speed as known in the art.

Figure 5:
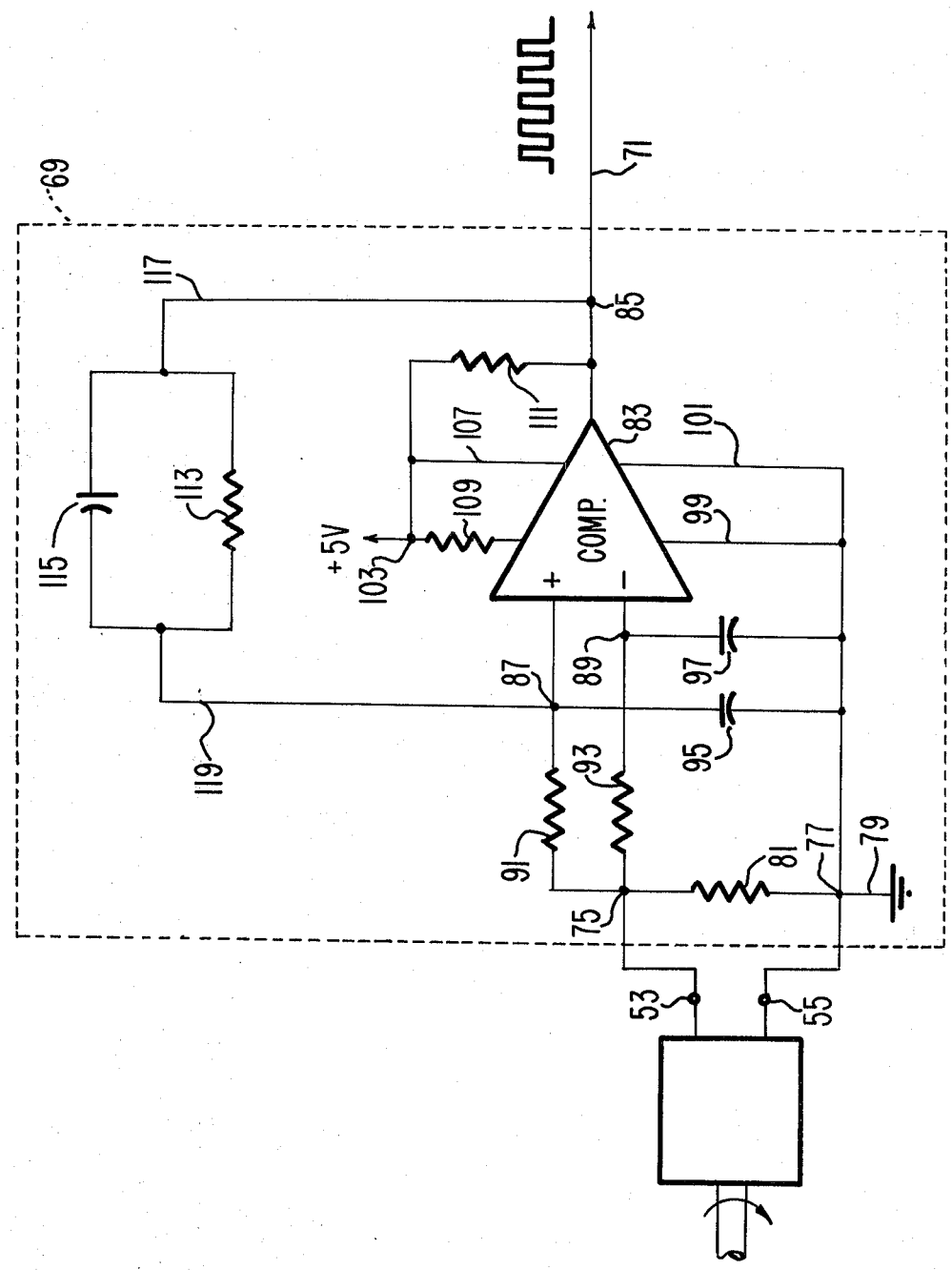
FIG. 5 is a schematic diagram of the slope-change detector circuit of FIG. 4.

The slope-change detector circuit of block 69 of the system of FIG. 4 is shown in FIG. 5 within the dotted block 69. The input to the circuit of FIG. 5 is taken from the outputs of the sensing coil 47 of FIG. 2 via inputs 53 and 55 respectively. Input 53 is directly connected to input node 75 and input 55 is directly connected to input reference node 77. Reference node 77 is connected directly to ground via lead 79 and input node 75 is connected to input reference node 77 via a current-sensing resistor 8 such that the current flowing in the sensing coil will pass through the current-sensing resistor 81 and increase and decrease with the reluctance changes in the toothed disk and housing assembly of FIG. 2. A differential voltage comparator 83 has its output connected to lead 71 at output node 85; has its positive input connected to a first comparator input node 87 and its negative input connected to a second comparator input node 89. Input node 75 is connected to the first comparator input node 87 via a first comparator input resistor 91 and the input node 75 is further connected to the second comparator input node 89 via a second comparator input resistor 93. The first comparator input 87 is connected to the reference node 77 via a first comparator input capacitor 95 and the second comparator input node 89 is connected to the reference node 77 via a second comparator input capacitor 97. The second input capacitor 97 provides some noise immunity but could be eliminated under certain conditions. The negative power supply inputs of the differential voltage comparator 83 are coupled to reference node 77 via leads 99 and 101 respectively. One of the positive power supply inputs of the differential voltage comparator 83 is connected to a positive reference input node 103 via lead 107 while the other positive reference input is connected to the node 103 via an offset-establishing resistor 109. The positive power supply node 103 is connected to a +5 volt source of potential. The output of the differential voltage comparator is taken from output node 85 which is coupled to power supply node 103 via a pull-up resistor 111. A feedback network comprising the parallel combination of a first feedback resistor 113 and a first feedback capacitor 115 have one end connected to output node 85 via lead 117 and the opposite end connected to the first comparator input node 87 via lead 119.

The first comparator input resistor 91 and the first input comparator capacitor 95 have a first RC time constant and the combination of the second comparator input resistor 93 and the second comparator input capacitor 97 have a second and different RC time constant such that the first resistor-capacitor combination 91, 95 and the second resistor-capacitor combination 93, 97 establish a differential voltage ratio between the comparator inputs 87 and 89 of the differential voltage comparator 83 which respond to the increases and decreases in the current in the current sensing resistor 81 via the changes in the voltage dropped across the current-sensing resistor 81 so as to detect a change in the polarity of the slope of the waveform of the current flowing through the current-sensing resistor 81. These changes in the current are caused by the changes in the reluctance of the system and a change in the polarity of the current slope corresponds approximately to a point of maximum or minimum reluctance as previously described. The occurrence of each peak of minimum or maximum reluctance induces this change in the slope of the current waveform and signals an increase or decrease in the reluctance from the respective minimum or maximum. The state of the output pulse of comparator 83 will change such that at each point at which maximum reluctance occurs, the pulse will go from negative to positive and will remain positive so long as the reluctance is decreasing. When the reluctance has decreased to a point at which minimum reluctance will have been reached, the reluctance will begin to go positive. At this point the output of the comparator 83 will go negative and continue negative so long as the reluctance is increasing. When the reluctance again reaches another maximum peak, the slope of the current through the current-sensing resistor 81 will again change and the output of comparator 85 will again go positive as the reluctance again begins to decrease. This continues at a rate proportional to the number of teeth on the toothed disk and the housing assembly as previously described. The feedback network comprising the parallel combination of feedback resistor 113 and feedback capacitor 115 couple the output of the differential comparator 83 back to the first positive input node 87, provide hysteresis, and insure that the system is relatively immune from noise and is not subject to errors such as may result from oscillations and the like.

Figure 6:
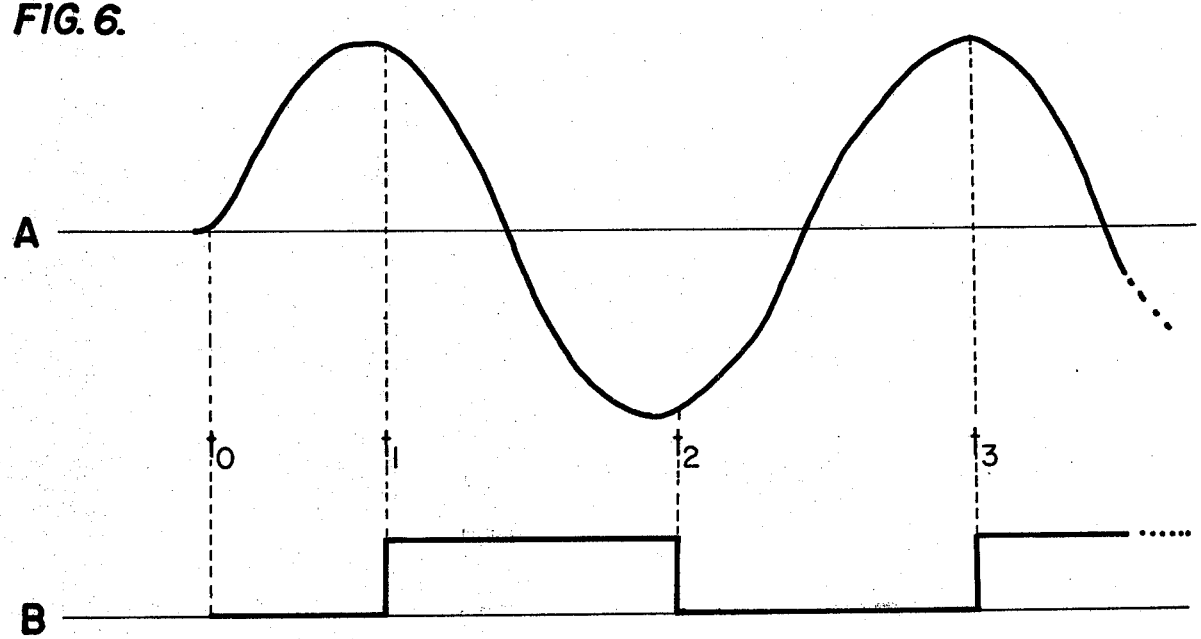
FIG. 6A–D is a waveform timing diagram showing the relationship between the signal outputted from the pickup coil and the output of the slope-change detector circuit of FIG. 5.
Figure 6:
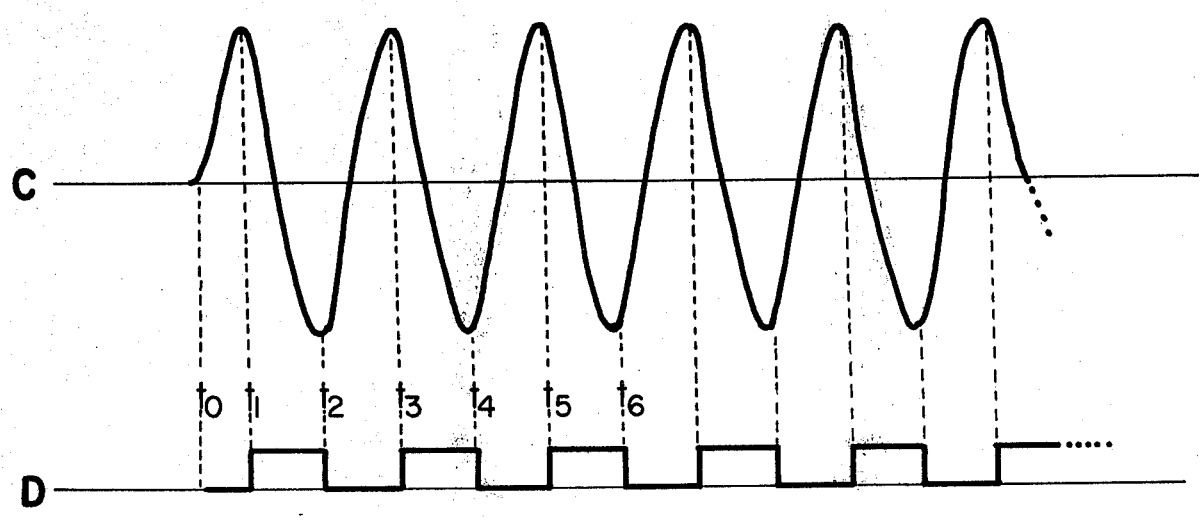

FIG. 6A depicts the waveform of the current flowing through the sensing resistor 81 of the circuit of FIG. 5. It will be noticed that the waveform is substantially sinusoidal but that small cusps or variations appear in the waveform at times $t_1$ and $t_3$ approximately when the points of maximum reluctance are reached at time $t_2$ when the approximate point of minimum reluctance is reached. The waveform shown in FIG. 6B illustrates the output of the differential voltage comparator 83 as taken from the output node 85. It will be noted that the pulse output was negative until time $t_1$ which corresponds to the first point at which maximum reluctance was reached and the slope of the current waveform changed as the reluctance began once more to decrease. At this time the comparator output pulse went positive and remained positive so long as the reluctance was decreasing. At time $t_2$, the reluctance reached a point of minimum reluctance and began to once more go positive. At this point the pulse at comparator output 85 again went negative and remained negative so long as the reluctance was increasing. The reluctance again peaked at time $t_3$ and the signal at output node 85 went positive. The signal will continue positive so long as the reluctance continues to decrease.

The waveform of FIG. 6C shows a similar sinusoid for a much higher velocity shaft rotation. It will be seen that the current waveform of the current through the current-sensing resistor 81 is substantially sinusoidal with the polarity of the slope of the current waveform changing as the points of maximum and minumum reluctance are passed. FIG. 6C shows that the approximate points of maximum reluctance occur at times $t_1$, $t_3$, $t_5$ etc. whereas the approximate points of minimum reluctance occur at the times $t_2$, $t_4$, $t_6$ etc. The pulse train of FIG. 6D represents the output of the comparator 83 as taken from output node 85. Again, it will be observed that the comparator output pulses change state at the approximate points at which the slope of the current waveform changes the points of maximum reluctance and the points of minimum reluctance are traversed. The system as built and tested appeared to work equally well for very slow shaft rotations such as may result when the shaft is rotated slowly by hand at very high speed shaft rotations without error or ambiguity and with high quality pulse definition.

Although specific apparatus has been shown for the purpose of describing applicants' invention, it will be apparent to those skilled in the art that other variations and modifications in the specific structure illustrated may be made without departing from the spirit and scope of the present invention which is limited only by the appended claims.

What is claimed is:

1. A system for generating digital pulses at a rate proportional to the speed of rotation of a shaft having toothed disk means attached to said rotating shaft and including a first set of M teeth about the periphery thereof and housing assembly means including a second set of M tooth-like members, said housing means further including means for positioning said M tooth-like members around said toothed disk means for establishing a flux path therebetween comprising:

detector means responsive to the position of said toothed disk means with respect to said housing assembly means for generating an output pulse which changes state at the approximate relative position which establishes a minimum of reluctance in said flux path and at the approximate relative position which establishes a maximum of reluctance in said flux path, thereby generating digital pulses at a rate proportional to the speed of rotation of said shaft, said detector means comprising means coupled to said housing assembly means and about at least a portion of said flux path for sensing increases and decreases in the reluctance of said flux path, said reluctance sensing means including an electrical coil wrapped around at least a portion of said flux path for generating an electrical current which increases and decreases with the increases and decreases of the reluctance of said flux path and an electrical current-sensing resistor means coupled between the opposite end of said electrical coil for sensing said generated electrical current; and means responsive to said reluctance sensing means for generating a first output signal when said reluctance has ceased to increase and begun to decrease and for generating a second output signal when said reluctance has ceased to decrease and begun to increase, said means responsive to said reluctance sensing means including differential voltage comparator means having a first and second input and a comparator output, and means coupled across said current-sensing resistive means and responsive thereto such that the output of said comparator means will pass said first output signal when the current flowing in said current-sensing resistor means has ceased to increase and begun to decrease which is indicative of the reluctance of said flux path having ceased to increase and begun to decrease so as to establish a differential voltage ratio of a first polarity between said first and second inputs and such that the output of said comparator means will pass said second signal in response to the current in said current-sensing resistor means having ceased to decrease and begun to increase which is indicative of the reluctance of said flux path having ceased to decrease and begun to increase so as to establish a differential voltage ratio of a second polarity between said first and second inputs of said comparator means.

2. The digital pulse generating systems of claim 1 wherein said means coupled across said current-sensing resistive means and responsive thereto comprises:

a first resistor-capacitor means coupled across said current-sensing resistor means and having a first RC time constant;

a second resistor-capacitor means coupled across said current-sensing resistor means and having a second and different RC time constant; and means for coupling said first and second resistor-capacitor means to the first and second inputs of said differential voltage comparator means for establishing a differentiator voltage ratio of said first polarity between said first and second inputs when said current flowing in said current-sensing resistor means has ceased to increase and begun to decrease and for establishing a differential voltage ratio of said second polarity between the first and second inputs when the current flowing in said current-sensing resistor means has ceased to decrease and begun to increase.

3. The digital pulse generating system of claim 1 wherein toothed disk means and said housing assembly means comprise ferromagnetic material, wherein said system further includes a source of potential coupled to one end of said reluctance sensing coil for insuring a readable level of generated current, and wherein said reluctance-sensing means includes a diode means coupled across the opposite ends of said coil for protecting said sensing means.

4. A reluctance-responsive digital tachometer for providing a speed indication in a system utilizing a rotating shaft comprising:

disk means coupled to said rotating shaft, said disk means including a first set of tooth-like members about the periphery thereof;

means positioned about said disk means and fixed in relation to the rotation of said shaft for establishing a flux path through the tooth-like members of said rotating disk means;

means associated with said flux path-establishing means for sensing increases and decreases in the reluctance of said flux path, said sensing means including an electrical coil coupled about at least a portion of said flux path for sensing increases and decreases in the reluctance thereof;

electronic circuit means responsive to said sensing means for detecting the approximate points of minimum reluctance and the approximate points of maximum reluctance as said disk means rotates with respect to said flux path-establishing means for generating a train of digital pulses at a rate proportional to the speed of rotation of said shaft, said electronic circuit means including:

current-sensing resistor means coupled to said electrical coil for sensing the current flowing therein, a differential voltage comparator means having a first and second input and a comparator output said differential voltage comparator means for passing a first digital signal when a differential voltage ratio of a first polarity is established between said first and second inputs and for passing a second digital output signal when a differential voltage ratio of a second polarity is established between said first and second inputs, and RC network means coupled across said current-sensing resistor means and to said first and second inputs for establishing said differential voltage ratio of said first polarity when the current flowing in said current sensing resistor means ceases to increase and begins to decrease and for establishing said differential voltage ratio of said second polarity when the current flowing in said current-sensing resistor means ceases to decrease and begins to increase; and tachometer logic means responsive to said train of digital pulses for providing a speed indication.

5. The reluctance-responsive digital tachometer of claim 4 wherein said differential voltage comparator means includes a feedback means coupling the output of said differential voltage comparator to said first input for providing hysteresis and noise immunity.

6. The reluctance-responsive digital tachometer of claim 5 wherein said feedback means comprises the parallel combination of a first feedback resistor and a first feedback capacitor and wherein said ratio establishing means coupled across said current-sensing resistor means comprises:

a first comparator input resistor means coupled between the one end of said current-sensing resistor means and said first input;

a first comparator input capacitor means coupled between said first input and the opposite end of said current-sensing resistor means, the combination of said first comparator input resistor means and said first comparator input capacitor means having a first RC time constant;

a second comparator input resistor means coupled between said first end of said current-sensing resistor means and said second input; and a second comparator input capacitor means coupled between said second input and the opposite end of said current-sensing resistor means, the combination of said second comparator input resistor means and said second comparator input capacitor means having a second and different RC time constant for establishing a differential voltage ratio between said first and second inputs.

7. The reluctance-responsive digital tachometer of claim 6 wherein said disk means includes a first set of N tooth-like members about the periphery thereof; wherein said flux-path establishing means includes a second set of M tooth-like members positioned in cooperative relationship to said first set of N tooth-like members for establishing said flux path through tooth-like members; and wherein the number of digital pulses generated per revolution of said shaft may be increased to a maximum of N × M and generally increased as the values of N and M are increased.

8. The reluctance-responsive digital tachometer of claim 6 wherein said disk means and said flux path-establishing means comprise non-magnetic material and wherein said sensing means includes a source of potential coupled between opposite ends of said electrical coil for insuring sufficient electrical current to said current-sensing resistor means.

9. A system for generating digital pulses at a rate proportional to the speed of rotation of the rotating shaft having flux path establishing means positioned about said rotating shaft comprising:
reluctance changing means coupled to said rotating shaft and positioned to form a portion of said established flux path for changing the reluctance of said established flux path in proportion to the speed of rotation of said shaft, said reluctance changing means including at least one flux-passing member extending radially a predetermined distance away from said rotating shaft and means for coupling said flux-passing member to said shaft for rotation therewith, said coupling means further comprising means for defining a portion of said established flux path, and wherein said flux path-establishing means includes a first flux path-establishing portion positioned in cooperative relationship to a first portion of said coupling means for forming a flux path therebetween, a second flux-path establishing portion positioned in cooperative relationship to a second portion of said coupling means for completing said established flux path through said coupling means and a base portion for establishing a flux path between said first and second portions so as to complete the establishment of the continuous flux path, said flux-passing member being positionable with respect to said first portion of said flux path-establishing means with the rotation of said shaft for increasing and decreasing the reluctance of said established flux path in proportion to the speed of rotation of said shaft;
means responsive to said changes in the reluctance of said established flux path for generating digital pulses at a rate proportional to the speed of rotation of said shaft, said responsive means including means for sensing said increases and decreases in the reluctance of said established flux path, and electrical means responsive to said reluctance having ceased to increase and begun to decrease for causing a transition from one level of an electrical signal to a second level and being responsive to said reluctance having ceased to decrease and begun to increase for causing a transition from said second level of electrical signal to said first level thereby defining said generated electrical pulses; and
said reluctance sensing means comprises an electrical coil coupled to said flux-path establishing means for generating an electrical current which increases and decreases in proportion to said reluctance changes, and wherein said electrical circuit means comprises current-sensing resistor coupled between the ends of said electrical coil, a differential voltage comparator having a first and second input and a comparator output, and resistor-capacitor means coupled across said current-sensing resistor and to said first and second inputs of said comparator means for establishing a differential voltage ratio between said first and second inputs such that a first plurality of differential voltage ratio established between said first and second inputs and indicative of the current in said current-sensing resistor having ceased to increase and begun to decrease for causing said differential voltage comparator means to generate an output signal at a first signal level and such that the establishment of a differential voltage ratio of the second polarity between said first and second inputs indicative of said current in said current-sensing resistor having ceased to decrease and begun to increase for causing said differential voltage comparator means to output a second level of output signal.

10. The system of claim 9 wherein said electronic circuit means further includes feedback means for providing hysteresis in noise immunity, said feedback means comprising the parallel combination of a feedback capacitor and a feedback resistor coupled between the output of said comparator and said first input and wherein said resistor-capacitor means coupled across said current-sensing resistor means comprises:
a first comparator input resistor coupled between one end of said current-sensing resistor and said first input;
a first comparator input capacitor coupled between said first input and the opposite end of said current-sensing resistor, the combination of said first comparator input resistor and said first comparator input capacitor having a first RC time constant;
a second comparator input resistor coupled between the first end of said current-sensing resistor and said second comparator input; and
a second comparator input capacitor coupled between said second input and the opposite end of said current-sensing resistor, the combination of said second comparator input resistor and said second comparator input capacitor having a second and different RC time constant such that the ratio of said first comparator input resistor and said first comparator input capacitor to the combination of said second comparator input resistor and said second input comparator capacitor establish said differential voltage ratio between said first and second inputs.

* * * * *